United States Patent
Pittore (10) Patent No.: US 6,414,699 B1
(45) Date of Patent: Jul. 2, 2002

(54) MESSAGE BOX FACILITY FOR GRAPHICAL USER INTERFACE FOR COMPUTER SYSTEM VIDEO DISPLAY

(75) Inventor: William F. Pittore, Lexington, MA (US)

(73) Assignee: Sun Microsystems, Inc., Mountain View, CA (US)

( * ) Notice: Subject to any disclaimer, the term of this patent is extended or adjusted under 35 U.S.C. 154(b) by 0 days.

(21) Appl. No.: 08/444,841

(22) Filed: May 18, 1995

(51) Int. Cl.[7] .................................................. G06F 3/14
(52) U.S. Cl. ....................... 345/808; 345/809; 345/770; 345/769; 345/804; 709/328; 709/312
(58) Field of Search .................................. 395/155, 157, 395/159, 161, 700, 144, 146, 347, 975, 340, 346, 354, 348, 682, 680, 793, 802; 345/808, 809, 975, 769, 770, 840, 804, 810, 835, 846; 709/328, 329, 310, 312; 707/531, 530, 539

(56) References Cited

U.S. PATENT DOCUMENTS

| | | | | |
|---|---|---|---|---|
| 5,119,476 A | * | 6/1992 | Texier | 345/809 |
| 5,155,806 A | * | 10/1992 | Hoeber et al. | 345/711 |
| 5,276,794 A | * | 1/1994 | Lamb, Jr. | 707/507 |
| 5,377,318 A | * | 12/1994 | Wolber | 345/809 |
| 5,479,598 A | * | 12/1995 | Feitelson et al. | 345/772 |
| 5,566,291 A | * | 10/1996 | Boulton et al. | 345/709 |
| 5,579,466 A | * | 11/1996 | Habib et al. | 707/52.9 |
| 5,821,932 A | * | 10/1998 | Pittore | 345/809 |

* cited by examiner

Primary Examiner—Raymond J. Bayerl (57) ABSTRACT

A computer system includes a visual display device for displaying information to an operator, a common buffer such as the Microsoft Window™ clipboard, and a processor for processing an application program, the processor performing predetermined processing operations under control of the applications program. If selected conditions are detected during processing, the processor will enable generation of a message box including a message text item, an actuable copy enable facility, and an actuable message box removal facility, and enable the message box to be displayed by the visual display device. The processor, in response to actuation of the copy enable facility by the operator, will copy the message text item to the common buffer, thereby preserving it for future examination through, for example, a clipboard viewer or text editor, which may be enabled after the message box has been removed from the visual display device in response to actuation of the message box removal facility by the operator.

42 Claims, 5 Drawing Sheets

MESSAGE BOX FACILITY FOR GRAPHICAL USER INTERFACE FOR COMPUTER SYSTEM VIDEO DISPLAY

FIELD OF THE INVENTION

The invention relates generally to the field of digital computer systems, and more particularly to graphical user interfaces for video displays for digital computer systems. The invention particularly provides a new and improved "message box" facility for enabling applications programs and operating system programs to facilitate the display of messages concerning detected error and other conditions to an operator and to retain the message information after the boxes have been removed.

BACKGROUND OF THE INVENTION

In the past, using a computer system often required a user to remember complex and sometimes arcane commands or keystroke combinations in order to enable a program to perform usefull processing. In an attempt to reduce these complexities, "graphical user interfaces" have been developed, which provide a number of facilities which simplify computer use in a number of ways. At a minimum a graphical user interface typically provides facilities by which the commands which a program can accept may be easily displayed to an operator, and the operator may select ones of the commands to be executed. This eliminates the necessity of the operator remembering the commands that the program can accept and also eliminates command entry errors, such as typographical errors, which may occur if the operator has to type in the commands manually. The primary graphical user interface facility for an applications program generally is organized as a window, with which the operator interacts with the program, entering data for processing, entering commands and viewing processed data. In addition, graphical user interfaces provide facilities such as dialog boxes, which may be displayed by a user in the event that program needs specific operator input such as values for various parameters for commands issued by the operator, and message boxes which may be used by a program to display messages to an operator if it detects certain conditions such as errors. One problem with current graphical user interfaces, however, is that they will provide mechanisms only for removing message boxes, so that the indication of error or other condition which caused display of the message box will be lost if the operator has not transcribed the message on paper.

SUMMARY OF THE INVENTION

The invention provides a computer system providing a new and improved "message box" facility for use in connection with a graphical user interface which enables applications programs and operating system programs to facilitate the display of messages to an operator and to retain the message information after the boxes have been removed.

In brief summary, the invention provides a computer system that comprises a visual display device for displaying information to an operator, a common buffer, an application program processor and a controller. The applications program processor performs predetermined processing operations, and detects selected conditions in connection with its performance of the predetermined processing operations. If the applications program processor detects a selected condition, it enables generation of a message box including a message text item, an actuable copy enable facility, and an actuable message box removal facility, and further enables the message box to be displayed by the visual display device. The controller enables the message text item to be copied to the common buffer in response to actuation of said copy enable facility by the operator, thereby preserving it for future examination through, for example, a clipboard viewer or text editor, which may be enabled after the message box has been removed from the visual display device in response to actuation of the message box removal facility by the operator.

BRIEF DESCRIPTION OF TSE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
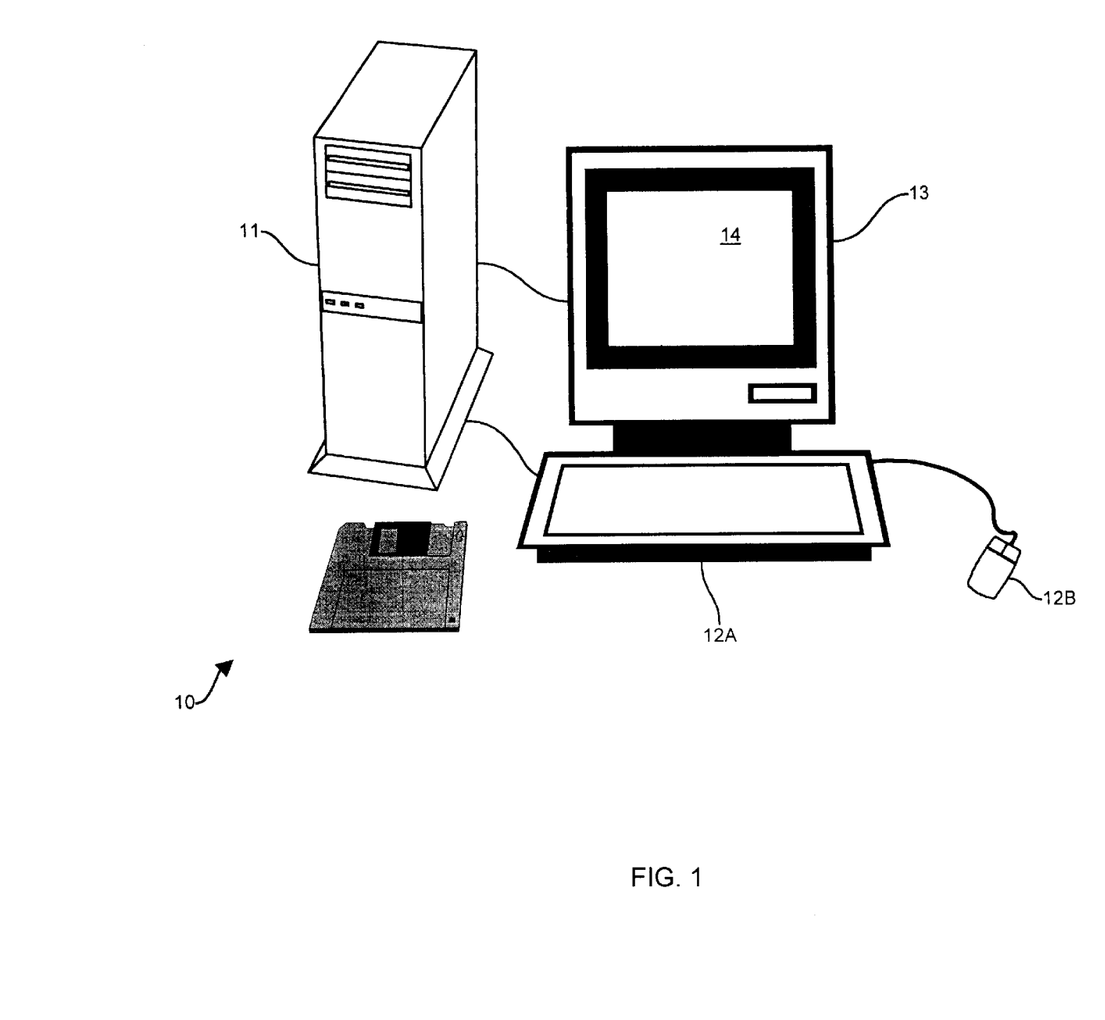
FIG. 1 depicts an illustrative computer system incorporating a graphical user interface in accordance with the invention for displaying information to an operator.

FIG. 1 depicts an illustrative computer system 10 incorporating a graphical user interface, in accordance with the invention, for displaying information to an operator. With reference to FIG. 1, the computer system 10 in one embodiment includes a processor module 11 and operator interface elements comprising operator input components such as a keyboard 12A and/or a mouse 12B (generally identified as operator input element(s) 12) and an operator output element such as a video display device 13. The illustrative computer system 10 is of the conventional stored-program computer architecture. The processor module 11 includes, for example, processor, memory and mass storage devices such as disk and/or tape storage elements (not separately shown) which perform processing and storage operations in connection with digital data provided thereto. The operator input element(s) 12 are provided to permit an operator to input information for processing. The video display device 13 is provided to display output information generated by the processor module 11 to the operator, including data that the operator may input for processing, information that the operator may input to control processing, as well as information generated during processing. The processor module 11 generates information for display by the video display device 13 using a so-called "graphical user interface" ("GUI"), in which information for various applications programs is displayed using various "windows," one embodiment of which will be described in greater detail below in connection with FIG. 2. Although the computer system 10 is shown as comprising particular components, such as the keyboard 12A and mouse 12B for receiving input information from an operator, and a video display device 13 for displaying output information to the operator, it will be appreciated that the computer system 10 may include a variety of components in addition to or instead of those depicted in FIG. 1.

Figure 2:
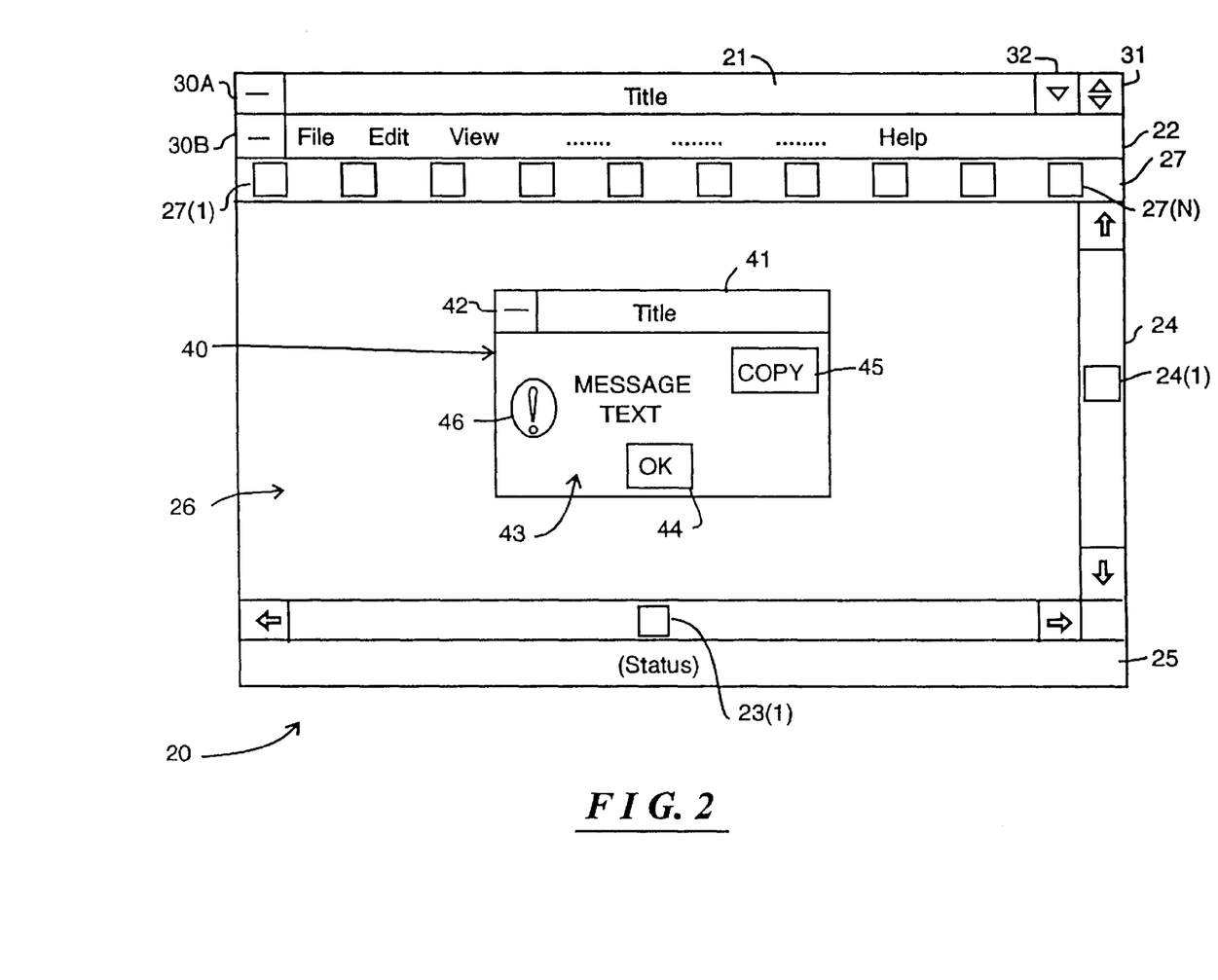
FIG. 2 is a schematic representation of a window of the graphical user interface, including a message box constructed in accordance with the invention.

As noted above, the video display device 13 displays information to the operator in the form of a graphical user interface, in which information is displayed in the form of a window. Typically in a graphical user interface, each applications program is provided with a separate window in which it may enable display of information to the user, which information may include information as processed by the applications program as well as information which the user has provided to the applications program for processing through an operator input element 12. An illustrative window 20 useful in one embodiment of the graphical user interface is depicted in FIG. 2. With reference to FIG. 2, window 20 includes a number of window elements which are typical of windows that may be used in connection with applications programs which run under the Microsoft Windows™ operating system, including a title bar 21, a menu bar 22, horizontal and vertical scroll bars 23 and 24, and a status bar 25, as well as an information display area 26. The title bar 21 identifies the title of the applications program, and the menu bar 22 provides a number of textual pull-down menu items which an operator can use to issue commands to control the applications program. As is conventional, the user may, by inputting appropriate keystroke patterns on the keyboard 12A or by controlling the position of an on-screen pointer (not shown) by manipulating the mouse 12B, select and actuate ones of the menu items and thereby issue the corresponding commands to the applications program. In addition, a window 20 may include a button bar 27 including a number of buttons 27(1) through 27(N) (generally identified by reference numeral 27(n)) each of which may also be associated with a command for controlling the applications program; the operator can issue a command to the applications program through the button bar 27 by actuating the appropriate button in a similar manner.

Window 20 includes several other elements, including system menu elements 30A and 30B and two window control push-buttons 31 and 32. The system menu elements 30A and 301B provide a system menu which enables the operator to issue commands to the operating system program to control the computer system 10. The window control push-buttons 31 and 32 enable the operator to control various aspects of the window 20. For example, if the operator inputs a predetermined keystroke combination using the keyboard 12A or suitably manipulates the mouse 12B to actuate the window control push-button 31, the window 20 may switch between occupying the entire screen of the video display device 13, and occupying somewhat less that the full screen. If the operator similarly inputs a predetermined keystroke combination or suitably manipulates the mouse 12B to actuate the window control push-button 32, the window 20 may minimize itself to an icon (not shown) displayed by the video display device 13.

The applications program can use the information display area 26 to display program information to a user. If the applications program has more program information which may be displayed than can be displayed in the information display area 26, the window 20 may provide the horizontal and vertical scroll bars 23 and 24 to enable the user to scroll through the information. Each scroll bar 23 and 24 includes a slider 23(1), 24(1) whose horizontal or vertical position can be controlled by the operator by mainpulating the on-screen mouse pointer to control the portion of the applications program's information that is displayed on the video display device 13.

While operating, the applications program may, in addition to the window 20, make use of a number of other graphical display devices, including dialog boxes, message boxes and the like. When a command requires entry by an operator of values for various parameters and other control information for execution, an applications program may use a dialog box (not shown) to obtain such values from the operator. Typically, a dialog box will include several window elements which are similar to to those described above in connection with window 20, including a title bar and an information display area, but in the case of a dialog box the information display area will be constrained to identify the types of parameters and other control information to be supplied by the operator, as well as blank areas in which the operator can insert the parameter and control information values.

The applications program may use message boxes to, for example, provide information of a critical nature to the operator, which the operator might otherwise missed if it is merely displayed on the status bar 25, to display information if a status bar is not provided, or to display types of information which are not shown on the status bar 25 if a status bar is provided. The applications program may use a message box to display a variety of types of information, including but not limited to error messages if the applications program detects error conditions in execution of commands or other processing. A message box 40 constructed in accordance with the invention is shown in FIG. 2.

As shown in FIG. 2, the message box 40, like window 20, includes a title bar 41, a system menu element 42 and an information area 43, as well as two push-buttons, namely, an "OK" push-button 44 and a "COPY" push-button 45. The title bar identifies the program for which the message box was generated, which may be an applications program or the operating system program. If the computer system 10 is a multi-tasking system, in which the computer system can process a number of applications programs concurrently, and display windows such as window 20 for all or only some of the applications programs being processed, it will be appreciated that the applications program for which the message box was generated need not be associated with an applications program whose window(s) are being displayed, and so the title bar will, if the message box was generated for an applications program, provide the identification of the applications program to the operator. The system menu 42, like system menu elements 30A and 30B, enables the opearator to issue commands to the operating system program, including, for example, commands to enable the operating system program to move the message box 40 to another position on the screen of the video display device 13 and to close the message box 40 thereby enabling the box 40 to be removed from the display and previously-displayed material overwritten by the box 40 returned to the display. The message information display area 43 generally will display message text items, shown generically as "MESSAGE TEXT" in FIG. 2, and may also include a graphic such as the highlighted exclamation point 46 to alert the operator that an message of some urgency is being displayed. The operator may actuate the OK push-button 44 to cause the message box to be closed. In accordance with the invention, the operator may, prior to actuating the OK push-button 44, actuate the COPY push-button 45 to enable the message text that is displayed in the message information display area 43 to be copied to, for example, a common holding buffer provided by the computer system's operating system, such as the Windows Tm clipboard in the case of the Microsoft Wmdows T operating system, from which the text can later be copied for farther analysis. This will enable the operator to save the message text, without requiring him or her to remember it or manually copy it onto paper, and thereafter recall it for review during a service call or error recovery operation.

Figure 3:
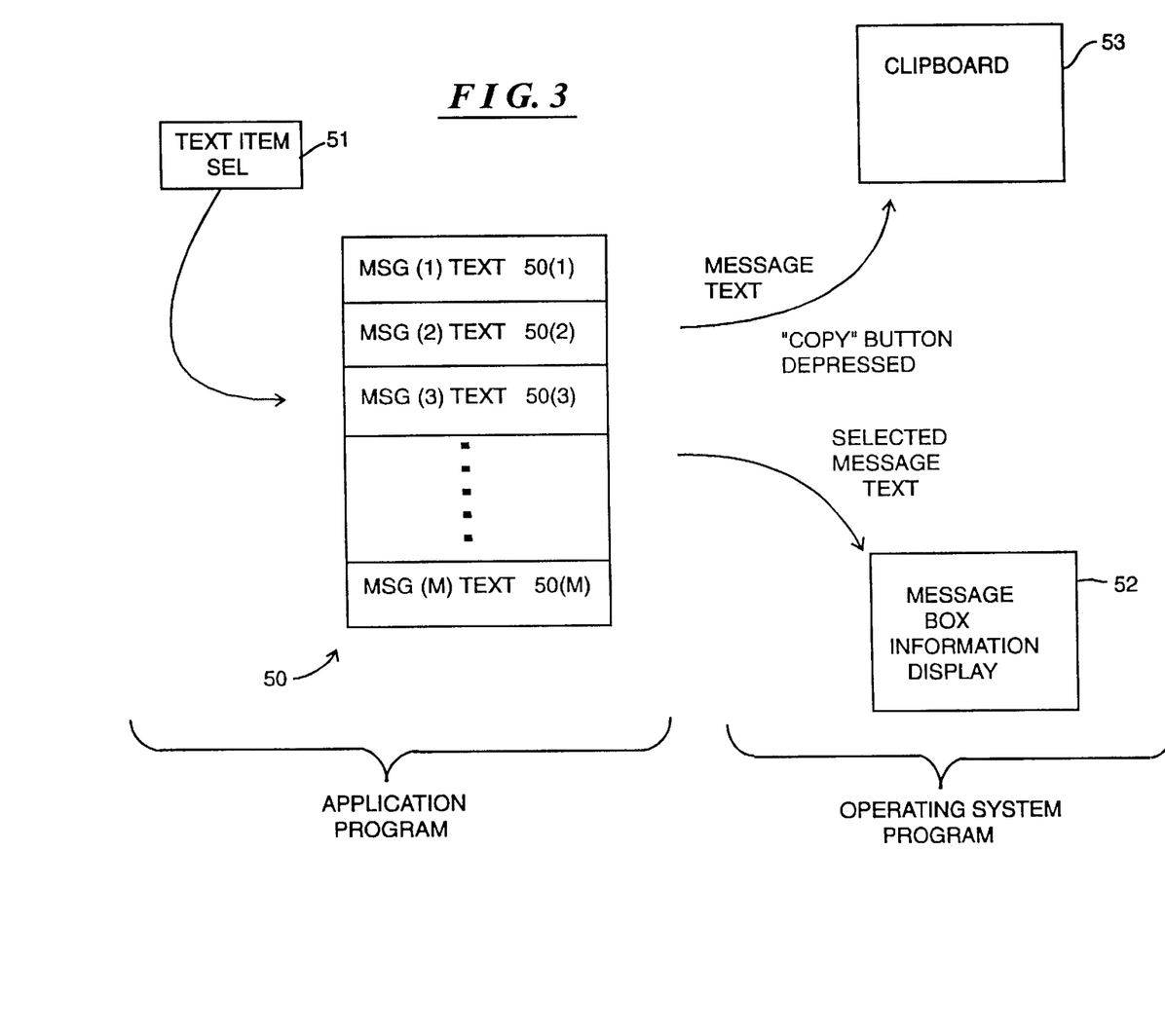
FIG. 3 schematically represents various data structures useful with the invention.
Figure 4A:
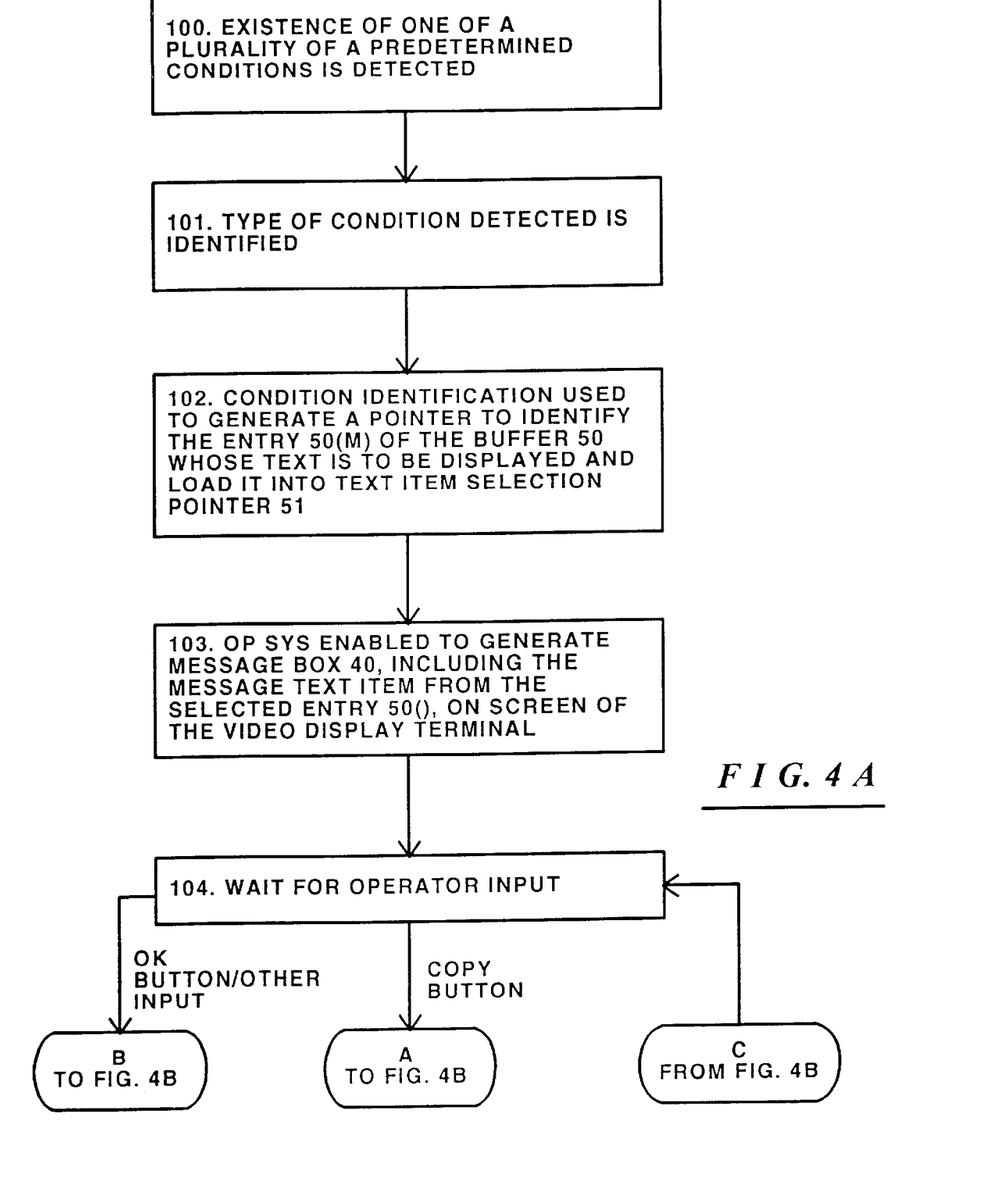
FIGS. 4A and 4B together comprise is a flow chart depicting the operations performed by an applications program and operating'system program in connection with the invention.
Figure 4B:
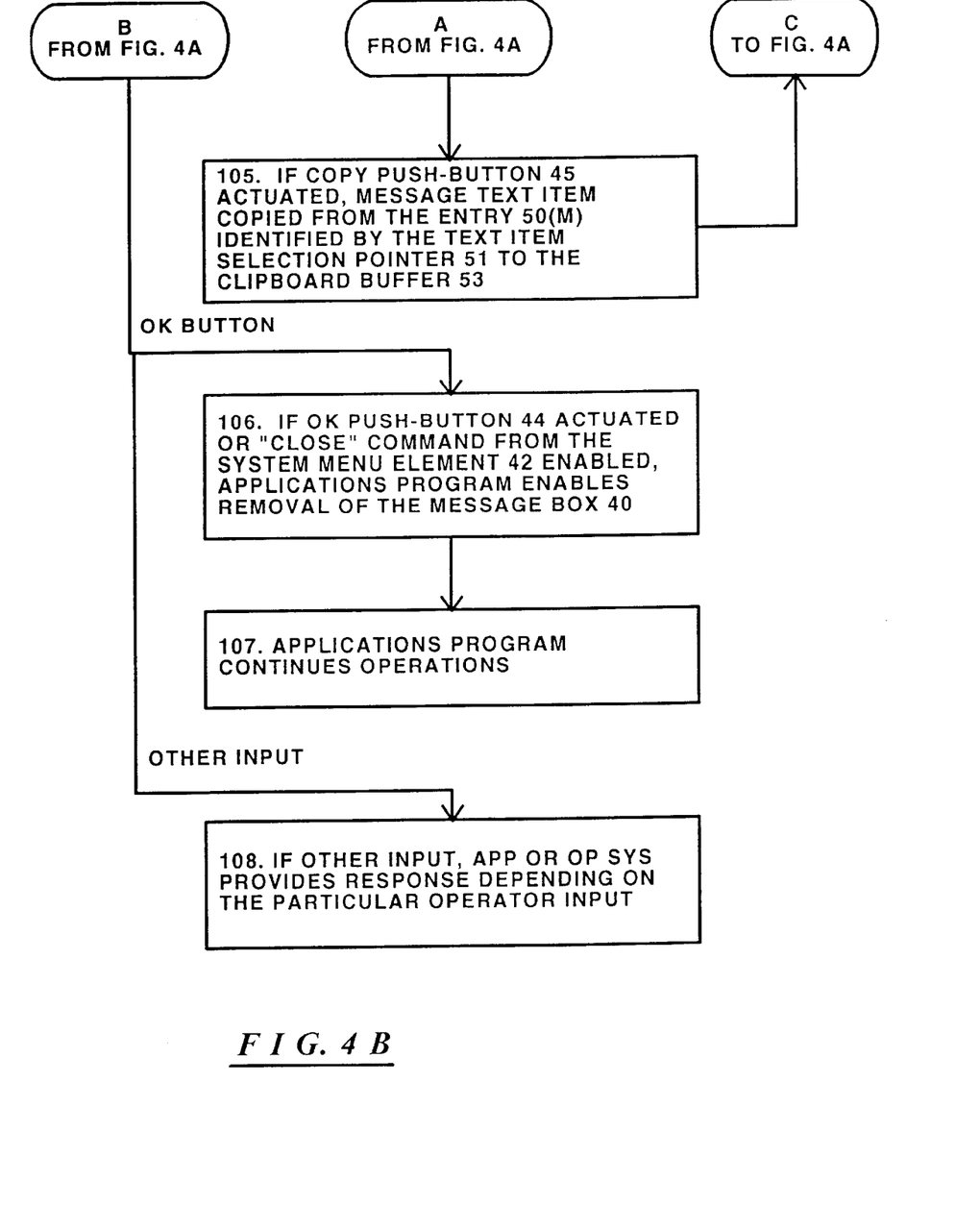

The operations performed by the computer system 10 in connection with the message box 40 will be described in connection with FIGS. 3 and 4. FIG. 3 graphically illustrates various data structures which are used in connection with one embodiment of the invention, and FIG. 4 depicts a flow-chart illustrating the operations performed by the computer system 10, in particular an applications program, in connection with the invention. With reference initially to FIG. 3, as illustrated in FIG. 3 the applications program which will utilize the message box 40 to display message text typically includes at least one buffer, represented by buffer 50, which includes a plurality of entries 50(1) through 50(M) (generally identified by reference numeral 50(m)), with each entry 50(m) storing a message text item. Each message text item comprises actual text that an applications program may enable to be displayed in the message information display area 43 of a message box 40. The applications program, in response to the detection of an error or other condition requiring a display of a message box, may load a text item selection pointer 51, with a pointer which identifying a particular one of the entries 50(m), in particular, the entry 50(m) whose message text item is to be displayed.

The operating system program of the computer system 10 provides various facilities for use in connection with the invention, including a message box information display buffer 52 and a clipboard buffer 53. The message box information display buffer 52 provides a buffer into which the message text from the selected entry 50(m) of the buffer 50 can be transferred for display in the message information display area 43 of the message box 40. As will be described below in connection with FIG. 4, the operating system, in response to a request from the applications program, will generate a message box 40 and will display the message text buffered in the buffer 52 as the message text in the message information display area 43. The clipboard buffer 53 is provided as the above-described common buffer into which the application program can copy the message text item from the selected entry 50(m) if the operator actuates the copy push-button 45.

With this background, the operations performed by the applications program and the operating system program in connection with the invention will be described in connection with the flow-chart in FIG. 4. With reference to FIG. 4, when the applications program detects the existence of one of a plurality of predetermined conditions, such as an error condition (step 100), it proceeds to identify the type of condition (step 101) and use the identification to generate a pointer to identify the entry 50(m) of the buffer 50 whose text is to be displayed and load it into text item selection pointer 51 (step 102). The applications program then calls the operating system program to generate the message box 40, including the various elements as described above in connection with FIG. 2 and the message text item from the selected entry 50(m), and to display it on the screen of the video display terminal 13 with the message text item (step 103).

Thereafter, the applications program may wait for input from the operator, such as an indication from the operating system program that the operator has activated the OK push-button 44 or the COPY push-button 45 of the displayed message box (step 104). If the operating system program indicates to the applications program that the operator has activated the COPY push-button 45, the applications program provides the message text item from the entry 50(m) identified by the text item selection pointer 51 for storage by the operating system program in the clipboard buffer 53 (step 105), and thereafter returns to step 104. If the operating system program indicates to the applications program in step 104 that the operator has activated the OK push-button 44 or has issued the "close" command from the system menu element 42, the applications program will enable the operating system program to remove the message box 40 and return the portion of the screen previously covered by the message box with the previously-displayed image (step 106). The applications program, following step 106, will continue its operations (step 107).

K on the other hand, the applications program determines in step 104 that the operator has performed some other action, the applications program or operating system program may respond with a particular response which depend on the particular action from the operator (step 108). If, for example, the operator issues selected keystrokes, such as depressing an ESCAPE key on the keyboard 12A, the applications program or operating system program may perform similar operations as described above in connection with actuation of the OK push-button 44 or issuance of the "close" command from the system menu element 42 (step 106). On the other hand, if the operator issues other keystrokes, attempts to actuate other push-buttons or manipulates the mouse 12B other than as described in connection with step 104, the applications program or operating system program may ignore such operator input.

Although the invention has been described in connection with a message box 40 generated in response to a request from an applications program, it will be appreciated that the operating system program may itself encounter a condition in which it may generate a message box 40. Accordingly, the operating system program may include facilities and perform operations which are similar to those described above with respect to the applications program.

It will further be appreciated that numerous changes and modifications may be made to the system described above in connection with FIGS. 1 through 4. For example, instead of providing a plurality of pre-generated message text items buffered in individual entries 50(m) of buffer 50, and selecting a particular item for display using a text item selection pointer 51, it will be appreciated that an applications program may, in response to the detection of a condition requiring a message box 40, generate the message text item "on-the-fly," and buffer it in a buffer before calling the operating system program to generate the message box (step 103). In that case, if the operating system program indicates to the applications program that the operator has actuated the COPY pushbutton 45 in step 104, the applications program can copy the message text item from the buffer to the clipboard.

Furthermore, instead of providing the message text item from the entry 50(m) of buffer 50 pointed to by the text item selection pointer 51, it will be appreciated that the applications program may instead provide the text item selection pointer 51 to the operating system program, and the operating system program may itself retrieve the contents of the entry 50(m) for display in the message information display area 43 of the message box 40.

In addition, it will be appreciated that other facilities may be provided, instead of or in addition to the COPY push-button 45, to enable the message text item displayed in the message box 40 to be copied to the clipboard buffer 53. For example, a combination of keystrokes on the keyboard 12A may enable the message text item to be copied, and the message box 40 may provide a legend indicating the required keystroke combination. In addition, an entry in the system menu 42 may be provided to enable the message text item to be copied.

Furthermore, actuation of the OK push-button 44 may, in addition to enabling removal of the message box 40, also enable copying of the message text item to the clipboard buffer 53. It will be appreciated that one disadvantage of such an arrangement, however, is that it removes operator control over copying of information to the clipboard buffer 53, which may be undesirable if such copying may cause information which was previously copied to the clipboard buffer 53 to be erased.

The various elements of the window 20 as described above are generally typical of a window provided by the Microsoft Windows Tm operating system for an applications program, but the specific elements and windowing facilities used by an applications program will depend on that particular applications program, and so window 20 is intended to be merely illustrative of windows for applications programs and operating system programs which may advantageously make use of the message box 40 in accordance with the invention. For example, one operating system which provides a graphical user interface, such as the X Window System defined by the "X Consortium," provides applications with the ability to provide "alert" boxes having similar functions as message boxes as provided by the Microsoft Windows operating system. With the X Window System's "alert" boxes, however, a button bar, similar to button bar 27, is provided, and the COPY pushbutton may be provided as one of the push-buttons of the alert box's button bar. Similarly, the box may provide a menu bar similar to menu bar 22, and a COPY menu item may be provided to facilitate the copying operation as described above in connection with COPY push-button 45.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. An information processing system comprising:
   A. a visual display device for displaying information to an operator;
   B. a common buffer;
   C. an applications program processor for performing predetermined processing operations, the applications program processor detecting selected conditions in connection with its performance of the predetermined processing operations, providing a message text item in response to the detection of one of the selected conditions, and enabling generation of a message box therefor including the message text item and an actuable copy enable facility, said applications program processor enabling the message box to be displayed by the visual display device; and
   D. a control subsystem for enabling (i) the message box generated by said applications program processor to be displayed by the visual display device and (ii) said message text item to be copied to the common buffer in response to actuation of said copy enable facility by an operator.

2. An information processing system as defined in claim 1 in which said applications program processor includes:
   A. a condition detector for detecting selected conditions in connection with its performance of the predetermined processing operations;
   B. a message text item generator for providing a message text item in response to the condition detector detecting one of the selected conditions; and
   C. a message box generator responsive to the detection of one of said selected conditions for enabling generation of a message box including the message text item as provided by the message text item generator and said operator-actuable copy enable facility.

3. An information processing system as defined in claim 2 in which said operator actuable copy enable facility comprises an operator actuable pushbutton.

4. An information processing system as defined in claim 3 in which said operator actuable pushbutton is actuable by an operator manipulable pointing device.

5. An information processing system as defined in claim 1 in which said applications program processor further generates said message box to include an actuable message box removal facility, said control subsystem further enabling the message box to be removed from the visual display device in response to actuation of the message box removal facility by the operator.

6. A information processing system as defined in claim 5 in which said actuable box removal facility comprises an operator actuable pushbutton.

7. An information processing system as defined in claim 6 in which said operator actuable pushbutton is actuable by an operator manipulable pointing device.

8. An information processing system comprising:
   A. a computer system including a visual display device for displaying information to an operator;
   B. a control subsystem for controlling said computer system including:
      i. a common buffer establishment enabling element for enabling said computer system to establish a common buffer;
      ii. an applications program processing enabling element for enabling said computer system to perform predetermined processing operations, the applications program processing enabling element enabling said computer system to detect selected conditions in connection with performing the predetermined processing operations, to provide a message text item in response to the detection of one of the selected conditions, to generate a message box therefor including the message text item and an actuable copy enable facility; and
      iii. a control subsystem for controlling said computer system to enable (i) the message box to be displayed by the visual display device and (ii) said message text item to be copied to the common buffer in response to actuation of said copy enable facility by an operator.

9. An information processing system as defined in claim 8 in which said applications program processing enabling element includes:
   A. a condition detection enabling element for enabling said computer system to detect selected conditions in connection with its performance of the predetermined processing operations;
   B. a message text item generation enabling element for enabling said computer system to provide a message text item in response to the detection of one of the selected conditions; and C. a message box generation enabling element for enabling said computer system to generate a message box in response to detection of one of said selected conditions, said message box including the message text item and said operator-actuable copy enable facility.

10. An information processing system as defined in claim 9 in which said operator actuable copy enable facility comprises an operator actuable pushbutton.

11. An information processing system as defined in claim 10 in which said operator actuable pushbutton is actuable by an operator manipulable pointing device.

12. An information processing system as defined in claim 8 in which said applications program processing enabling element further enables said computer system to generate said message box to an actuable message box removal facility, said control subsystem further enabling the computer system to remove the message box from the visual display device in response to actuation of the message box removal facility by the operator.

13. An information processing system as defined in claim 12, in which said actuable box removal facility comprises an operator actuable pushbutton.

14. An information processing system as defined in claim 13, in which said operator actuable pushbutton is actuable by an operator manipulable pointing device.

15. A control subsystem for controlling a computer system including a visual display device for displaying information to an operator, the control subsystem comprising:
   A. a common buffer establishment enabling element for enabling said computer system to establish a common buffer;
   B. an applications program processing enabling element for enabling said computer system to perform predetermined processing operations, the applications program processing enabling element enabling said computer system to detect selected conditions in connection with performing the predetermined processing operations, to provide a message text item in response to the detection of one of the selected conditions, to generate a message box therefor including the message text item and an actuable copy enable facility; and
   C. a control subsystem for controlling said computer system to enable (i) the message box to be displayed by the visual display device and (ii) said message text item to be copied to the common buffer in response to actuation of said copy enable facility by an operator.

16. A control subsystem as defined in claim 15 in which said applications program processing enabling element includes:
   A. a condition detection enabling element for enabling said computer system to detect selected conditions in connection with its performance of the predetermined processing operations;
   B. a message text item generation enabling element for enabling said computer system to provide a message text item in response to the detection of one of the selected conditions; and
   C. a message box generation enabling element for enabling said computer system to generate a message box in response to detection of one of said selected conditions, said message box including the message text item and said operator-actuable copy enable facility.

17. A control subsystem as defined in claim 16 in which said operator actuable copy enable facility comprises an operator actuable pushbutton.

18. A control subsystem as defined in claim 17 in which said operator actuable pushbutton is actuable by an operator manipulable pointing device.

19. A control subsystem as defined in claim 15 in which said applications program processing enabling element further enables said computer system to generate said message box to include an actuable message box removal facility, said control subsystem further enabling the computer system to remove the message box from the visual display device in response to actuation of the message box removal facility by the operator.

20. A control subsystem as defined in claim 19 in which said actuable box removal facility comprises an operator actuable pushbutton.

21. A control subsystem as defined in claim 20 in which said operator actuable pushbutton is actuable by an operator manipulable pointing device.

22. A computer program product comprising a computer system usable medium having computer system readable code embodied therein for causing a computer system to perform predetermined processing operations and to generate a message box for display to an operator in response to detection of predetermined conditions, the computer system program product including:
   A. common buffer code devices configured to cause a computer system to establish a common buffer;
   B. application program code devices configured to cause a computer system to perform predetermined processing operations and to enable said computer system to detect selected conditions in connection with performing the predetermined processing operations, to provide a message text item in response to the detection of one of the selected conditions, to generate a message box therefor including the message text item and an actuable copy enable facility; and
   C. control code devices configured to cause a computer system to enable (i) the message box to be displayed by the visual display device and (ii) said message text item to be copied to the common buffer in response to actuation of said copy enable facility by an operator.

23. A computer program product as defined in claim 22 in which said applications program code devices include:
   A. selected condition detection code devices configured to cause a computer system to detect selected conditions in connection with its performance of the predetermined processing operations;
   B. message text item code devices configured to cause a computer system to provide a message text item in response to the detection of one of the selected conditions; and
   C. message box code devices configured to cause a computer system to generate a message box in response to detection of one of said selected conditions, said message box including the message text item and said operator-actuable copy enable facility.

24. A computer program product as defined in claim 23 in which said operator actuable copy enable facility comprises an operator actuable pushbutton.

25. A computer program product as defined in claim 24 in which said operator actuable pushbutton is actuable by an operator manipulable pointing device.

26. A computer program product as defined in claim 22 in which said application program code devices further enable said computer system to generate said message box to include an actuable message box removal facility, and to remove the message box from the visual display device in response to actuation of the message box removal facility by the operator.

27. A computer program product as defined in claim 26 in which said actuable box removal facility comprises an operator actuable pushbutton.

28. A computer program product as defined in claim 27 in which said operator actuable pushbutton is actuable by an operator manipulable pointing device.

29. A method comprising the steps of:

A. establishing a common buffer;

B. performing predetermined processing operations,

C. in the course of performing said predetermined processing operations, in response to detection of one of a plurality of selected conditions, generating a message box including a message text item corresponding to the detected condition and an actuable copy enable facility;

D. enabling the message box to be displayed by a visual display device; and

E. enabling said message text item to be copied to the common buffer in response to actuation of said copy enable facility by an operator.

30. A method as defined in claim 29 in which said message box generation step includes the steps of:

A. detecting selected conditions during performance of the predetermined processing operations;

B. providing a message text item in response to the detection of one of the selected conditions; and C. generating a message box in response to detection of one of said selected conditions, said message box including the message text item and said operator-actuable copy facility.

31. A method as defined in claim 30 in which said operator actuable copy enable facility comprises an operator actuable pushbutton.

32. A method as defined in claim 31 in which said operator actuable pushbutton is actuable by an operator manipulable pointing device.

33. A method as defined in claim 29 in which said message box generating step further generates the message box to include an actuable message box removal facility, said message box being removed from the visual display device in response to actuation of the message box removal facility by the operator.

34. A method as defined in claim 33 in which said actuable box removal facility comprises an operator actuable pushbutton.

35. A method as defined in claim 34 in which said operator actuable pushbutton is actuable by an operator manipulable pointing device.

36. A method of controlling a computer system comprising the steps of:

A. enabling the computer system to establish a common buffer;

B. enabling the computer system to perform predetermined processing operations,

C. enabling the computer system to, in the course of performing said predetermined processing operations, generate a message box including a message text item and an actuable copy enable facility in response to detection of one of a plurality of selected conditions;

D. enabling the computer system to display the message box by a visual display device and E. enabling the computer system to copy said message text item to the common buffer inresponse to actuation of said copy enable facility by an operator.

37. A method as defined in claim 36 in which said message box generation step includes the steps of:

A. enabling the computer system to detect selected conditions during performance of the predetermined processing operations;

B. enabling the computer system to provide a message text item in response to the detection of one of the selected conditions; and C. enabling the computer system to generate a message box in response to detection of one of said selected conditions, said message box including the message text item and said operatoractuable copy facility.

38. A method as defined in claim 37 in which said operator actuable copy enable facility comprises an operator actuable pushbutton.

39. A method as defined in claim 38 in which said operator actuable pushbutton is actuable by an operator manipulable pointing device.

40. A method as defined in claim 36 in which said message box generating step further enables said computer system to generate the message box to include an actuable message box removal facility, said message box being removed from the visual display device in response to actuation of the message box removal facility by the operator.

41. A method as defined in claim 40 in which said actuable box removal facility comprises an operator actuable pushbutton.

42. A method as defined in claim 41 in which said operator actuable pushbutton is actuable by an operator manipulable pointing device.

* * * * *